No. 792,008.　　　　　　　　　　　　　　　　　　　　Patented June 13, 1905.

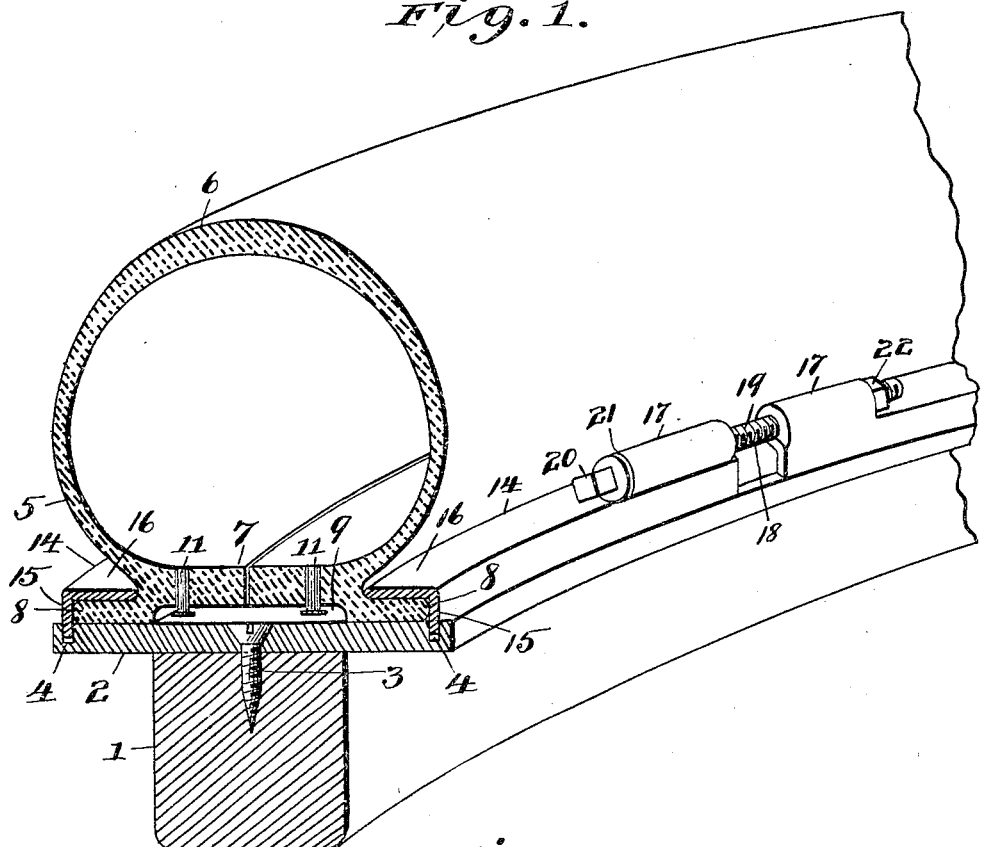
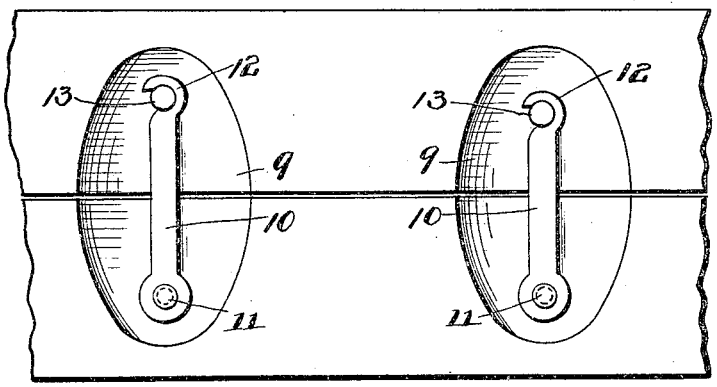

UNITED STATES PATENT OFFICE.

PERRY ERNEST DOOLITTLE, OF TORONTO, CANADA.

PNEUMATIC TIRE.

SPECIFICATION forming part of Letters Patent No. 792,008, dated June 13, 1905.

Application filed September 25, 1903. Serial No. 174,669.

*To all whom it may concern:*

Be it known that I, PERRY ERNEST DOOLITTLE, a subject of the King of Great Britain, residing at Toronto, in the Province of Ontario and Dominion of Canada, have invented new and useful Improvements in Pneumatic Tires, of which the following is a specification.

My invention relates to pneumatic tires, and is more especially adapted for use on automobiles and carriages where the tire is subjected to excessive weight and road-strain.

The objects of my invention are to provide a tire that may be easily and quickly removed for purpose of repair and replaced on the wheel-felly by any ordinary individual using the same, to provide a form of tire-fastening that will securely fasten the tire to the wheel-felly and effectually prevent its "creeping" even when used in a deflated condition, and to provide a form of tire that can be used a reasonable distance in a deflated condition without danger of injury to its structure, so that in the event of a puncture and consequent deflation not far from the destination no delay need be caused thereby.

A further object of my invention is to provide a double-tube tire that can be fully inflated off the wheel and carried in the vehicle, so that in the event of injury to a tire in use upon its removal the fully-inflated one can be quickly and easily attached in its place and the vehicle can at once proceed without the delay and exertion required to inflate the newly-attached tire.

For a full description of the invention and the merits thereof and also as to details of construction in effecting the result reference is had to the following description and accompanying drawings.

While the essential and characteristic features are susceptible of modification, still the preferred embodiment of the invention is illustrated in the accompanying drawings, in which—

Figure 1 is a perspective sectional view of the device attached to the felly of a wheel omitting the inner inflation-tube; and Fig. 2 is a view of the inner or rim side of the tire, showing the means for latching the same.

Corresponding and like parts are referred to in the following description and indicated in both views of the drawings by the same reference characters.

Referring to the drawings, 1 represents the felly of a vehicle-wheel, which may be of rectangular cross-section, as shown, or any other approved section, as may be desired, but so shaped that a rim 2, of steel or other suitable metal, may be securely attached to its outer surface around the entire circumference of the felly of the wheel. In the drawings the preferred attaching means are shown, which consist of screws 3, spaced around the circumference, countersunk into the rim, as shown. The preferred form of this rim is a flat hoop having along its top, at each edge, a groove 4 4, extending the entire length of the circumference of the rim and adapted to be used in connection with the clamping means to be hereinafter described; but I do not restrict myself to this form of flat hoop for a rim, as it may be of any suitable transverse section provided it contains the grooves 4, as above specified.

The tire is preferably of the double-tube variety and consists of the outer casing 5, having the usual thickened tread for impact on the road, as at 6, and having a divided base, as is common in such a form of tire, built up of non-elastic material suitable to be securely clamped to the rim 2. The inner or inflation tube (not shown) is of any approved form and texture in common use. The base of the outer tube 5 is made of some suitable approved non-elastic materal of considerable thickness, (more particularly shown at the central portion 7,) so that when the inner tube is deflated the road-pressure on the tire will still come upon the tread, which the base will support sufficiently high to prevent the thin sides of the tire from being pressed into injurious contact with the metal parts of the rim, thus permitting the tire to be used in a deflated condition for a short time in case of necessity or convenience without injury thereto. This central base portion 7 is provided with flanges 8 8 on each side thereof, of the same or similar non-elastic material, but somewhat thinner than the central portion of the base and extending laterally when the outer tube is drawn tightly along its line of division to the inner edges of the grooves 4. In order that the outer tube may be thus tightly drawn together when used as a double-tube tire or when converted into one from a single-tube tire, as hereinafter noted, the under side of the central portion thereof is provided with a series of shallow pockets or spaces 9 at intervals around the circumference, in which are adapted to rest the latches 10, which are of usual form, as shown, having one end pivoted to the base portion on one side of its dividing-line by means of the rivet 11 or in some other suitable manner and the other end free and provided with a hook or other engaging means 12, adapted to engage a rivet, pin, or other projection 13, secured to the base portion of the other side of its dividing-line in such a relation that when the latch is fastened the outer tube 5 is drawn tightly together and entirely envelops the inner tube. The inner tube can then be inflated and the tire carried in such condition on the vehicle, being always ready for use—an advantage much to be desired with double-tube tires. It will also be noted that when the tire is placed on the rim 2 the practically integral base formed by engaging the latches 10 serves to prevent the inner tube from being forced into the opening between the edges of the base portion and becoming worn or injured thereby—that is, the entire surface on the inner side of the outer tube with which the inner tube comes in contact is smooth and even.

In order to securely attach the tire to the rim 2, and thus to the wheel of the vehicle, there are provided two clamping-bands 14 14, one on each side, preferably of angle-section, whose vertical sides 15 rest in the grooves 4, but do not reach their bottoms, and whose horizontal sides 16 rest upon the tops of the base-flanges 8. The grooves 4 are preferably rounded on their sides, so that the vertical sides 15 of the clamping-bands 14 will readily enter the same even if not accurately superimposed. It will be noted that these clamping-bands are so positioned that the tire is effectually prevented from either vertical or lateral movement. A clearance-space is provided between the bottom edge of the sides 15 of said bands and the bottom of the grooves 4 by not allowing the said edges to come down to the bottom of said grooves, and this clearance-space enables the clamping-band to be reduced in diameter when it is desired to tighten the same to clamp the tire more securely. To securely fasten the clamping-bands, a tightening device connects the ends thereof, consisting of lugs 17 17, mounted on the horizontal sides 16, one on each of said ends, which are made to approach or recede from each other by any suitable means. The preferred form here shown is a bolt 18, threaded on one end, as at 19, and provided on the other end with an angular head 20, having a collar 21, which abuts against one of the lugs 17. The other lug 17 is internally threaded and receives the end 19 of the bolt, which may be forced in by any suitable tool. A locknut 22 may be used, if desired; but I do not limit myself to this specific form of tightening means, as many other equally efficient forms may be used, such as threading the opposite ends of the bolt right and left handed and the lugs similarly with a power-nut in the center or the well-known turnbuckle, or, in fact, any means for drawing two separated parts together. This tightening device is made as small and compact as is consistent with strength and lies snugly on the clamping-band to insure of its being out of the way of causing any injurious pressure on the outer casing when the tire is used deflated.

To attach the tire, it is only necessary to slip it on the rim into its position between the grooves and with the clamping-bands extended by their tightening-bolts slip them into position and tighten up said bolts, which is quickly done by a few turns of the tightening-tool. To remove the tire for repairs or replacement, it is only necessary to loosen the bolts and remove the bands, when the tire will readily slip from the rim. Having no laterally-projecting bolts or lugs, it is little liable to damage in coming in contact with curbings or other obstacles.

My invention can also be practiced in connection with a single-tube tire in this way: The tire is first made up without the central opening and fully inflated and slipped on the rim, and then in the event of the tire getting punctured it can be cut open and an inside tube inserted. The single-tube tire having been first supplied with the pockets or recesses already described, the latches can be readily applied at the time the tire is cut open and the inner tube inserted, and thus all the advantages gained as above noted.

Obviously my invention may be used in widely-varying forms, and some features thereof may be used without others.

Therefore, without limiting myself to the construction shown and described nor enumerating equivalents, I claim, and desire to secure by Letters Patent, the following:

1. A pneumatic tire provided with a flanged base, in combination with a rim on the wheel-felly projecting laterally beyond said flanged base, grooves in said rim, and clamping-bands adapted to engage with said flanges and grooves to secure said tire rigidly to said rim and a clearance-space between the lower edge of the clamping-bands and the bottom of said grooves, substantially as described.

2. A double-tube pneumatic tire provided with a split outer tube, recesses in the under side of said outer tube and latches in said recesses whereby the sides of said split may be drawn together in intimate contact, substantially as described.

3. A pneumatic tire provided with a flanged and thickened base, whereby when the tire becomes deflated the tread rides on said base and the sides are protected from injury, in combination with a rim on the wheel-felly, grooves in said rim, clamping-bands adapted to engage said flanges and said grooves and secure said tire to said rim and a clearance-space between the lower edges of the clamping-bands and the bottoms of the grooves of the felly, substantially as described.

4. A double-tube pneumatic tire whose outer tube is provided with a flanged and thickened base, whereby when the tire becomes deflated the tread rides on said base and the sides are protected from injury, recesses in the under side of said base and latches in said recesses adapted to draw the sides of said outer tube together in intimate contact, in combination with a rim on the wheel-felly, grooves in said rim, and clamping-bands adapted to engage said flanges and said grooves and secure said tire to said rim, substantially as described.

5. A pneumatic tire having a flat base centrally thickened and provided with external flanges in combination with a rim flat on its periphery and provided with a groove near each edge; and clamping-bands adapted to engage the upper surfaces of the flanges and also the said grooves to secure the tire to the rim, the combined thickness of either flange and its band not being greater than the thickness of the central part of the base, substantially as described.

6. A pneumatic tire having a base provided with a central thickened portion and with external flanges in combination with a rim provided with a groove near each edge; and clamping-bands adapted to engage the upper surfaces of the flanges and also the said grooves to secure the tire to the rim, the combined thickness of either flange and its band not being greater than the thickness of the central part of the base, substantially as described.

7. A pneumatic tire having a base centrally thickened and provided with external flanges in combination with a rim provided with a groove near each edge; and angle-section clamping-bands adapted to engage the upper surfaces of the flanges, their vertical sides entering the said grooves a distance less than the depth of the grooves, substantially as described.

8. A pneumatic tire having a base centrally thickened and provided with external flanges in combination with a rim provided with a groove near each edge; and angle-section clamping-bands adapted to engage the upper surfaces of the flanges, their vertical sides entering the said grooves a distance less than the depth of the grooves, the combined thickness of either flange and its band not being greater than the thickness of the central part of the base, substantially as described.

9. In a pneumatic tire a cover with external flanges, a thickened central base portion, a rim flat on its periphery, clamping-bands adapted to clamp the flanges to the rim, the base portions of the tire being flat in cross-section both within and without the tire, and the combined thickness of either flange, its band and the side wall of the tire not being greater than the thickness of the central part of the base substantially as described.

In testimony whereof I have signed my name to this specification in the presence of two subscribing witnesses.

PERRY ERNEST DOOLITTLE.

Witnesses:
W. MILLARD McCAMMON,
MINNIE CURRY.